(12) United States Patent  
Li et al.

(10) Patent No.: US 8,165,983 B2  
(45) Date of Patent: *Apr. 24, 2012

(54) METHOD AND APPARATUS FOR RESOURCE ALLOCATION AMONG CLASSIFIERS IN CLASSIFICATION SYSTEMS

(75) Inventors: Chung-Sheng Li, Scarsdale, NY (US); Ching-Yung Lin, Forest Hills, NY (US); Milind R. Naphade, Fishkill, NY (US); John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1065 days.

This patent is subject to a terminal disclaimer.

(21) Appl. No.: 12/054,955

(22) Filed: Mar. 25, 2008

(65) Prior Publication Data

US 2008/0168462 A1 Jul. 10, 2008

Related U.S. Application Data

(63) Continuation of application No. 11/451,972, filed on Jun. 13, 2006, now Pat. No. 7,401,062.

(51) Int. Cl.
*G06F 17/00* (2006.01)
*G06F 15/18* (2006.01)
*G06N 5/02* (2006.01)

(52) U.S. Cl. .......................... 706/48; 706/14

(58) Field of Classification Search .................. 706/14, 706/15, 25, 45, 48; 709/223, 226; 382/165, 382/181, 190, 195

See application file for complete search history.

(56) References Cited

U.S. PATENT DOCUMENTS

| 6,345,279 B1* | 2/2002 | Li et al. ..................... 707/999.01 |
| 6,961,383 B1* | 11/2005 | Reibman et al. ............ 375/240.25 |
| 2003/0227889 A1* | 12/2003 | Wu et al. ........................ 455/447 |
| 2004/0095997 A1* | 5/2004 | Altunbasak et al. ........ 375/240.13 |
| 2004/0131121 A1* | 7/2004 | Dumitras et al. .......... 375/240.16 |
| 2005/0047503 A1* | 3/2005 | Han et al. .................. 375/240.01 |
| 2005/0050199 A1* | 3/2005 | Mital et al. ..................... 709/226 |
| 2005/0152280 A1* | 7/2005 | Pollin et al. ..................... 370/252 |
| 2006/0112038 A1* | 5/2006 | Luo ................................... 706/20 |
| 2006/0126527 A1* | 6/2006 | Cheung et al. ................. 370/252 |
| 2007/0150430 A1* | 6/2007 | Campbell et al. ............... 706/60 |
| 2007/0283016 A1* | 12/2007 | Pendarakis et al. ........... 709/226 |

OTHER PUBLICATIONS

Woods, K. et al. "Combination of Multiple Classifiers Using Local Accuracy Estimates" IEEE Transactions on Pattern Analysis and Machine Intelligence, vol. 19, No. 4, Apr. 1997. pp. 405-410.*
Landgrebe, T. et al. "Optimising Two-Stage Recognition Systems" N.C. Oza et al. (Eds.): MCS 2005, LNCS 3541, pp. 206-215, 2005.*
Jain, A. et al. "Adaptive Stream Resource Management Using Kalman Filters" SIGMOD 2004, Jun. 1318, 2004, Paris, France. Copyright 2004 ACM. 12 pages.*

(Continued)

*Primary Examiner* — Jeffrey A Gaffin
*Assistant Examiner* — Benjamin Buss
(74) *Attorney, Agent, or Firm* — Anne V. Dougherty; Ryan, Mason & Lewis, LLP

(57) ABSTRACT

Methods and apparatus for optimizing resource allocation among data analysis functions in a classification system are provided. Each of the data analysis functions is characterized as a set of operating points in accordance with at least one of resource requirements and analysis quality. An operating point for each of the data analysis functions is selected in accordance with one or more constraints. The analysis functions are applied at selected operating points to optimize resource allocation among the data analysis functions in the classification system.

20 Claims, 5 Drawing Sheets

OTHER PUBLICATIONS

Chi,Y. et al. "Loadstar: Load Shedding in Data Stream Mining" Proceedings of the 31st VLDB Conference, Trondheim, Norway, 2005. pp. 1302-1305.*

Turaga,D.S. et al. "Resource Management for Networked Classifiers in Distributed Stream Mining Systems" Proceedings of the Sixth International Conference on Data Mining (ICDM'06). IEEE 2006. 6 pages.*

Senator,T.E. "Multi-Stage Classification" Proceedings of the Fifth IEEE International Conference on Data Mining (ICDM'05). IEEE 2005. 8 pages.*

M.R. Naphade et al., "Modeling Semantic Concepts to Support Query by Keywords in Video," IEEE Proc. Intl. Conf. Image Processing (ICIP), Sep. 2002, pp. 145-148.

J.R. Smith et al., "Multimedia Semantic Indexing Using Model Vectors," IEEE Intl. Conf. on Multimedia and Expo (ICME), 2003, pp. 445-448.

J.R. Smith et al., "Validity Weighted Model Vector-Based Retrieval of Video," SPIE EI 2004—Storage and Retrieval for Media Databases, Jan. 2004, 9 pages.

* cited by examiner

METHOD AND APPARATUS FOR RESOURCE ALLOCATION AMONG CLASSIFIERS IN CLASSIFICATION SYSTEMS

CROSS-REFERENCE TO RELATED APPLICATION(S)

This application is a continuation of U.S. application Ser. No. 11/451,972 filed on Jun. 13, 2006, the disclosure of which is incorporated herein by reference, which is now U.S. Pat. No. 7,401,062.

FIELD OF THE INVENTION

The present invention relates to data classification systems and, more particularly to methods and apparatus for optimizing resource allocation among data analysis functions of a classification system.

BACKGROUND OF THE INVENTION

Recent growth in the amount, importance, and richness of unstructured information has instilled a need for more sophisticated data analysis and classification techniques. However, as the number and variety of data analysis functions applied to information sources increase for a given technique, resource requirements, in terms of computing, storage, communication, and human effort, also increase. This results in large scale data analysis systems that are often less responsive to a user's needs and unable to effectively provide quick answers or operate under constrained conditions. It is desirable for users and systems to efficiently and effectively exercise the trade-off of data analysis processing along a number of possible dimensions to make best use of resources within constrained conditions.

In the case of large-scale classification systems, there is a requirement to process, often simultaneously, large numbers of data sources using large numbers of classifiers. An example of such a system is real-time speech analysis or speaker identification in call centers. Typically, there are constraints in terms of total processing power or total response time that prevent the complete analysis required by the classification system. As a result there is a need to allocate resources among a large number of classifiers or data analysis functions given a constrained environment. Resource allocation strategies aid in adapting the large-scale classification systems to those applications in which there are limited resources and overwhelmingly large amounts of data and analysis functions. Such strategies are also useful when less accurate results are needed quickly, for example to trade-off the processing time for accuracy.

Large-scale classification is a significant problem arising in the context of video surveillance analysis in which many simultaneous information feeds or video streams must be analyzed and indexed. It is often not possible to complete a full classification of the contents of all of the streams simultaneously in real-time. However, it may be possible to select from a variety of classification algorithms, such as, for example, K-Nearest Neighbor (KNN), Support Vector Machines (SVMs), Gaussian Mixture Models (GMMs), Hidden Markov Models (HMMs), and Decision Trees, to best exercise the trade-off in computation and classification accuracy given the overall processing constraints of the systems or response time required by the user.

Other examples may include the analysis of Internet data, such as, for example, chat rooms, blogs, and streaming video, in which it is important to analyze multiple modalities, such as, for example, text, image, audio, speech, and XML. This type of data analysis involves significant processing in terms of feature extraction, clustering, classification and semantic concept detection. As a result there is a need for an interactive real-time system in which analysts or users may explore this type of data as well as run batch-mode analysis methods that apply large numbers of classifiers or data analysis functions.

M. Naphade et al., "Modeling Semantic Concepts to Support Query by Keywords in Video," *IEEE Proc. Int. Conf. Image Processing (ICIP)*, September 2002, teaches a system for modeling semantic concepts in video to allow searching based on automatically generated labels. This technique requires that video shots are analyzed using a process of visual feature extraction to analyze colors, textures, shapes, etc., followed by semantic concept detection to automatically label video contents, with labels such as "indoors," "outdoors," "face," "people," etc. Furthermore, new hybrid approaches, such as model vectors allow similarity searching based on semantic models. For example, J. R. Smith et al., "Multimedia Semantic Indexing Using Model Vectors," *IEEE Intl. Conf. on Multimedia and Expo (ICME)*, 2003, teaches a method for indexing multimedia documents using model vectors that describe the detection of concepts across a semantic lexicon. This approach requires that a full lexicon of concepts is analyzed in the video in order to provide a model vector index.

These large-scale classification systems need to support a trade-off in analysis quality of detectors with resources. In both of these cases, it is possible to choose from a variety of algorithms for the feature extraction and concept detection processes. For example, concepts may be detected using statistical models of the extracted features. One known modeling approach is based on SVMs that describe a discriminating boundary between concept classes in high-dimensional feature space. While SVMs may provide good accuracy for classification, they also require significant resources in terms of the representation of the model and its parameters. On the other hand, GMMs provide a more compact representation of the model that requires fewer resources, but, may not provide the same level of classification accuracy as SVMs. Alternatively, a batch mode analysis may be able to use a computationally expensive but high-quality KNN classification algorithm for detecting hundreds of different types of events in video. However, given an interactive system, it may be necessary to apply a faster Decision Tree classifier of less quality in order to get quick results.

The known solutions to this allocation problem involve either applying only subset of classifiers given constraints on resources, or using hierarchical classification structures that apply progressively more expensive and higher qualities of detectors on small sets of data in order to make more efficient use of resources. The problems with these solutions is that choosing not to run certain classifiers is not optimal when classification results are desired or needed for all detectors. Furthermore, hierarchical classification does not give quick results when high-quality classification is not needed.

Given these varied analysis approaches in large scale classification systems, there is a need to develop a system that provides an efficient or optimal trade-off among the important dimensions of the classifiers and collateral processing elements in order to best meet various constraints.

SUMMARY OF THE INVENTION

In accordance with the aforementioned and other objectives, the present invention is directed towards an apparatus and method for optimizing the allocation of resources among data analysis functions using through the selection of operating points to optimize classification performance given specific constraints.

For example, in one aspect of the present invention, a method for optimizing resource allocation among data analysis functions in a classification system is provided. Each of the data analysis functions is characterized as a set of operating points in accordance with at least one of resource requirements and analysis quality. An operating point for each of the data analysis functions is selected in accordance with one or more constraints. The analysis functions are applied at selected operating points to optimize resource allocation among the data analysis functions in the classification system.

In additional embodiments of the present invention, operating points correspond to classification algorithms represented in a multidimensional space corresponding to one or more dimensions of resource requirements and analysis quality. Given a set of data analysis functions along with constraints, it is an objective of the present invention to provide for the selection of operating points in order to optimize the overall system performance within given constraints.

It is, therefore, also an objective of the present invention to provide a method and apparatus that formulates the large scale classification problem as a resource allocation problem in which there are multiple data analysis functions or classification algorithms for each classification task.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As will be illustrated in detail below, the present invention introduces techniques for optimizing resource allocation among data analysis functions of a classification system.

Figure 1:
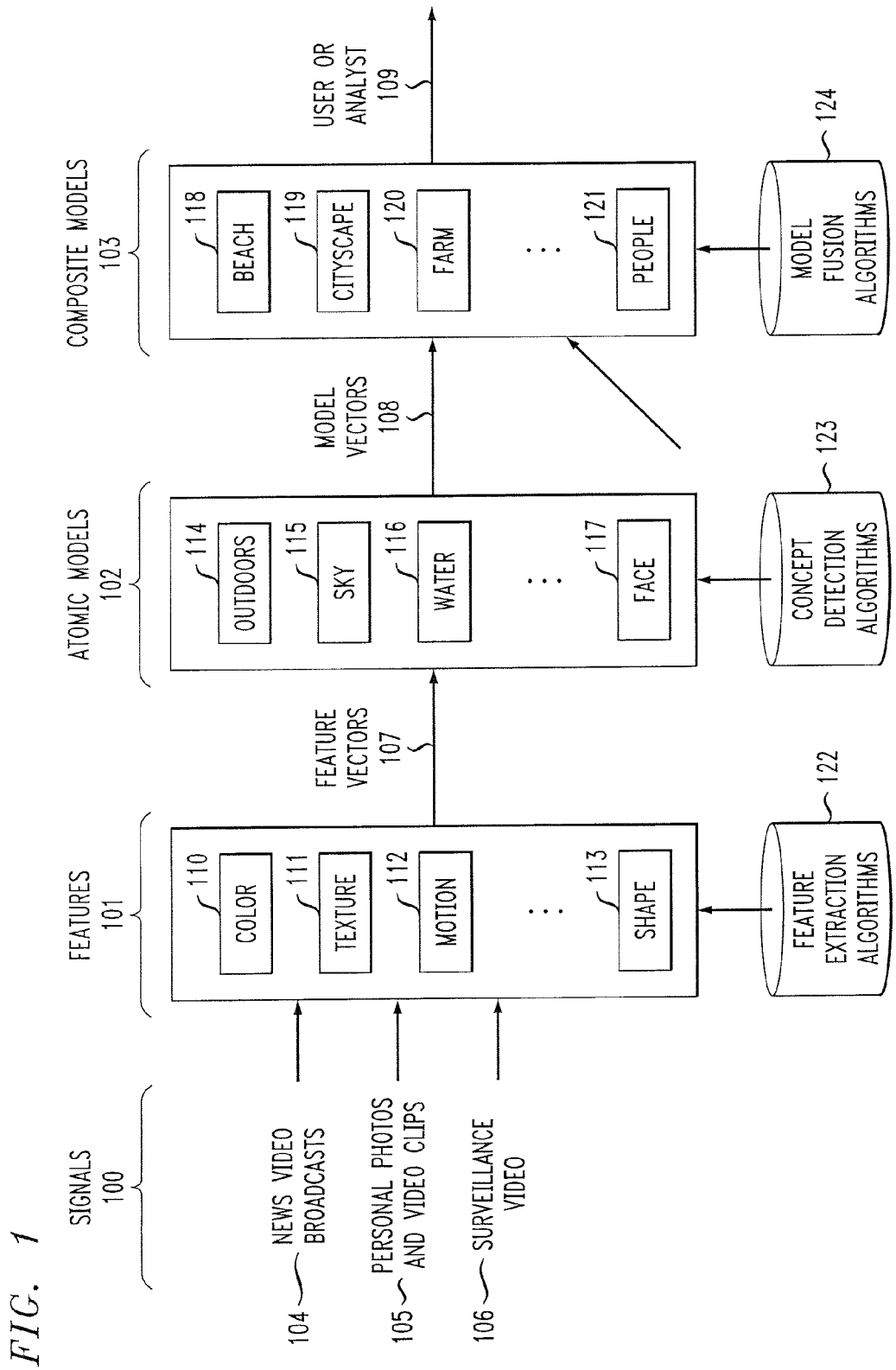
FIG. 1 is a diagram illustrating a large-scale classification system, according to an embodiment of the present invention.

Referring initially to FIG. 1, a diagram illustrates a large-scale classification system, according to an embodiment of the present invention. The system performs semantic concept detection on multimedia information sources, such as new video broadcasts 104, personal photos and video clips 105, and surveillance video 106. The processing for the large-scale classification system proceeds through multiple stages in which multiple information sources or signals 100 are acquired and processed to extract features 101. The feature extraction process typically involves the extraction of descriptors such as color 110, texture 111, motion 112, and shape 113. These descriptors or feature vectors 107 are then passed to one or more classification stages 102, 103. For example, a first stage may involve atomic models 102 that detect semantic concepts or classify extracted feature vectors 107 into classes such as "outdoors" 114, "sky" 115, "water" 116, and "face" 117. The combined output of these classifiers based on atomic models 102 may be represented as model vectors 108 and passed to a subsequent classification stage that detects semantic concepts using composite models for concepts such as "beach" 118, "cityscape" 119, "farm" 120 and "people" 121. Results of classifiers based on composite models 103 are passed on to a user or analyst 109.

In each of the aforementioned stages of processing feature extraction 101, atomic modeling 102 and composite modeling 103, it is possible to select from a variety of algorithms for processing. For example, the feature extraction process 101 may select from different feature extraction algorithms 122 that use different processing in producing feature vectors 107.

For example, color features 110 are often represented using color histograms that may be extracted at different levels of detail. This allows exercising of the trade-off of extraction speed and accuracy of the histogram in capturing the color distribution. One fast way to extract a color histogram is to coarsely sample the color pixels in the input images. A more expensive way to extract the color histogram is to count all pixels in the images. It is also possible to consider different feature representations for color. In practice a variety if color descriptors have been explored for image analysis, such as color histograms, color correlograms, color moments, etc. The extraction algorithms 122 for these descriptors have different characteristics in terms of processing requirements and effectiveness in capturing color features. In general, this variability in the feature extraction stage may result from a variety of factors including the dimensionality of the feature vector representation, the signal processing requirements and whether the feature extraction involves one or more modalities of input data, such as, for example, image, video, audio and text.

Similarly, modeling stages 102, 103 may involve a variety of concept detection algorithms 123 and model fusion algorithms 124. For example, given input feature vectors 107, it may be possible to use different classification algorithms for detecting whether video content should be assigned label "outdoors" 114. Concept detection algorithms 123 may be based on, for example, Naïve Bayes, KNN, SVMs, GMMs, HMMs, Decision Trees and Neural Nets. They may also optionally use context or knowledge. This classifier variability provides a rich range of operating points from which to trade-off dimensions such as response time and classification accuracy.

Furthermore, subsequent modeling stages, such as composite modeling 103 use input model vectors 108 to detect composite concepts such as "beach" 118 using a variety of fusion algorithms 124. This may involve classification of model vectors 108 using the same variety of classification algorithms as the prior atomic classification stage, or it may use other techniques such as linear regression or atomic model aggregation, in which atomic model 102 results are combined using functions that take minimum, maximum, and average products of the atomic model confidence scores.

Figure 2:
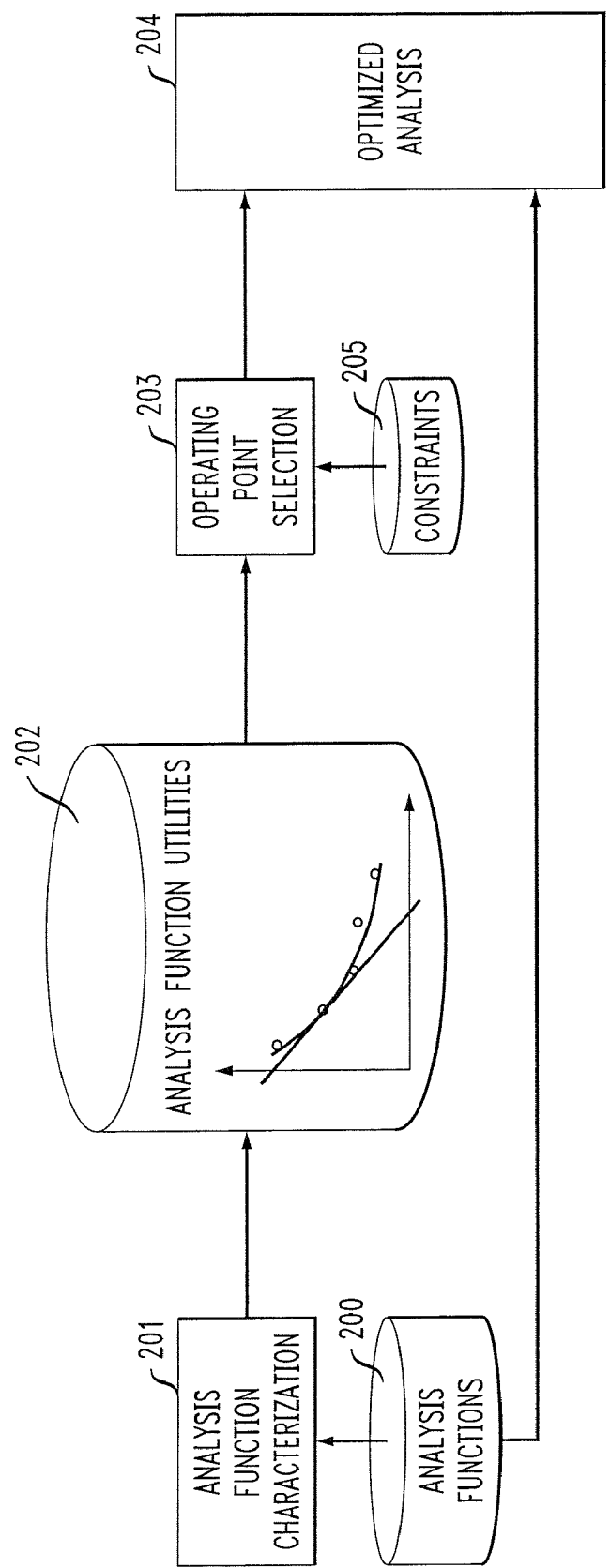
FIG. 2 is a flow diagram illustrating a resource allocation optimization methodology, according to an embodiment of the present invention.

Referring now to FIG. 2, a flow diagram illustrates a resource allocation optimization methodology, according to an embodiment of the present invention. The methodology allocates resources among classifiers in large scale classification systems. The method involves the characterization 201 of one or more analysis functions 200 that comprise the large scale classification system. As described above in FIG. 1, these analysis functions may involve feature extraction 101, atomic modeling 102, or composite modeling 103. More generally, the analysis functions may correspond to different feature extraction, clustering, classification or visualization methods. The characterization process 201 describes analysis functions 200 in terms of analysis function utilities 202. The utilities may be represented in a variety of ways including a set of operating points or utility functions in multi-dimensional space corresponding to various dimensions of resource requirements and analysis quality.

The resource requirements may be captured using dimensions corresponding to their computational, storage, communications, and/or human requirements. For example, different operating points of the analysis functions may require different amounts of computer processing. The analysis quality dimensions may correspond to mean average precision, classification rate, assessment of model validity, or information extracted from receiver operating characteristic (ROC) curves, reject curves, or precision/recall plots. The process of characterizing the analysis functions in terms of utility may be carried out either off-line or on-line during the operation of the large scale classification system. In the case of off-line characterization, such as when the analysis functions are characterized during their design, validation or evaluation period, the utilities may be described by metadata that is stored and later retrieved during an operating point selection step 203.

Given a classification task, the next step in the process involves selecting operating points 203 for the analysis functions given constraints of the system or user 205. The selection process may be formulated as a constrained optimization, such as to maximize the overall large scale classification system quality given constraint on response time. Once the operating points are selected, the next step is to apply analysis functions 204 using selected operating points to carry out the classification task.

Figure 3:
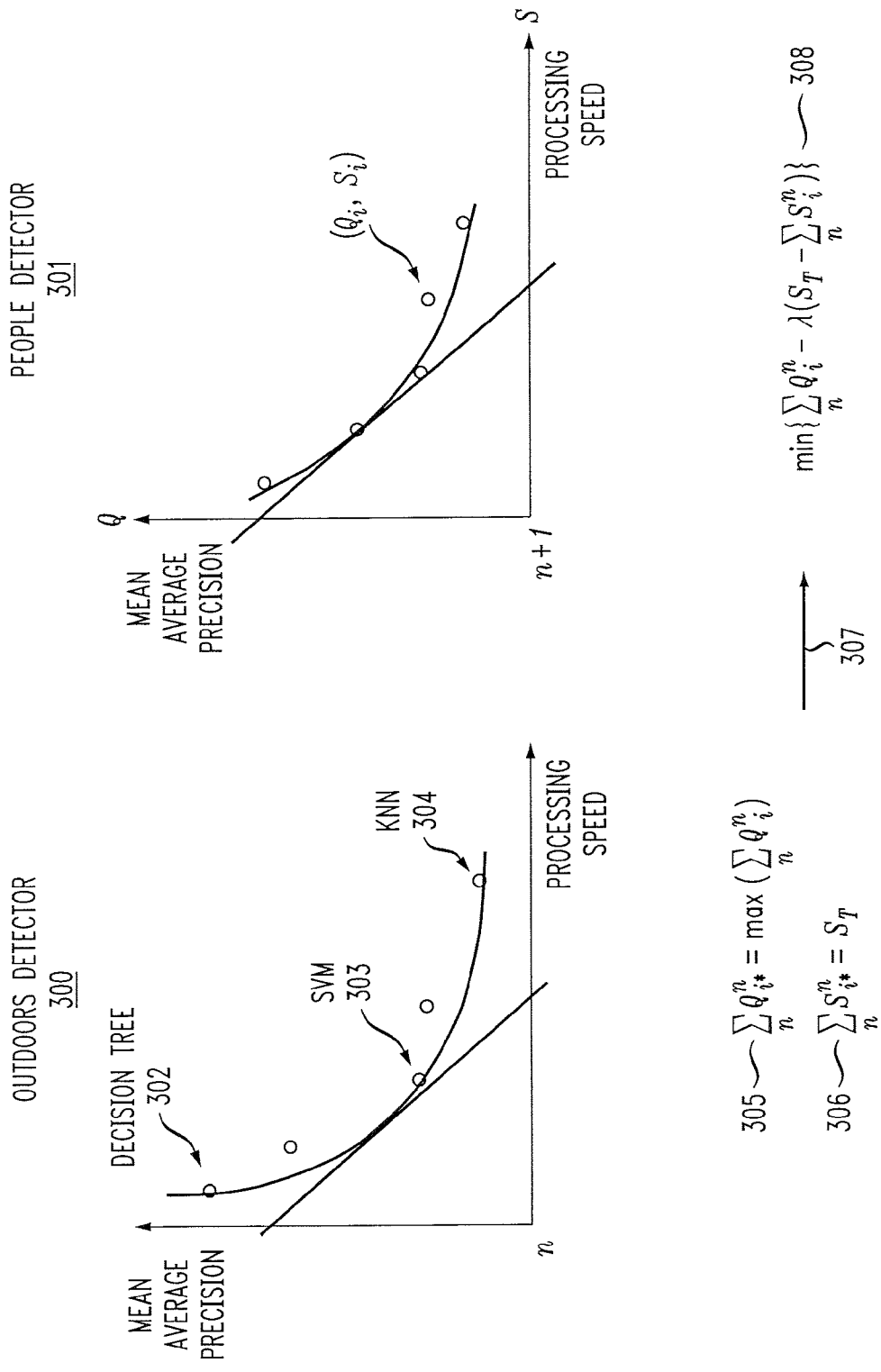
FIG. 3 is a diagram illustrating operating point selection, according to an embodiment of the present invention.

Referring now to FIG. 3, a diagram illustrates operating point selection, according to an embodiment of the present invention. This may be considered a detailed description of block 203 in FIG. 2. The process selects operating points 203 for two classifiers for digital images corresponding to an "outdoors" 300 detector and a "people" detector 301. In general, these may be two of many classifiers that are to be applied in the large scale classification system. The utility of each of these detectors is described using two dimensions corresponding to analysis quality (mean average precision) and requirements (processing speed). The utility in each case is characterized using a plurality of operating points in the two-dimensional space. For example, for "outdoors" detector 300, there are five operating points. These points correspond to different classification algorithms, such as Decision Tree 302, SVM 303, and KNN 304.

As described above, the operating point selection process may be formulated as a constrained optimization problem in which analysis quality if maximized under constraints based on available resources or response time. Similarity, the problem may be formulated as minimization of resource utilization given a target overall analysis quality. In general, many different optimization formulations may be used that work within the space defined by the dimensions of the utility characterizations of the classifiers.

In order to optimize the selection of operating points for the "outdoors" 300 and "people" 301 detectors, a constrained optimization problem 305, 306 is defined to maximize an overall mean average precision (summed across the two classifiers) 305 given budget response time in which the summed response times across the two classifiers must not exceed a budget 306. This constrained optimization problem may be converted 307 into an unconstrained optimization problem in which the optimal operating points are selected for each detector given the constraints using a highly efficient La Grangian method.

Figure 4:
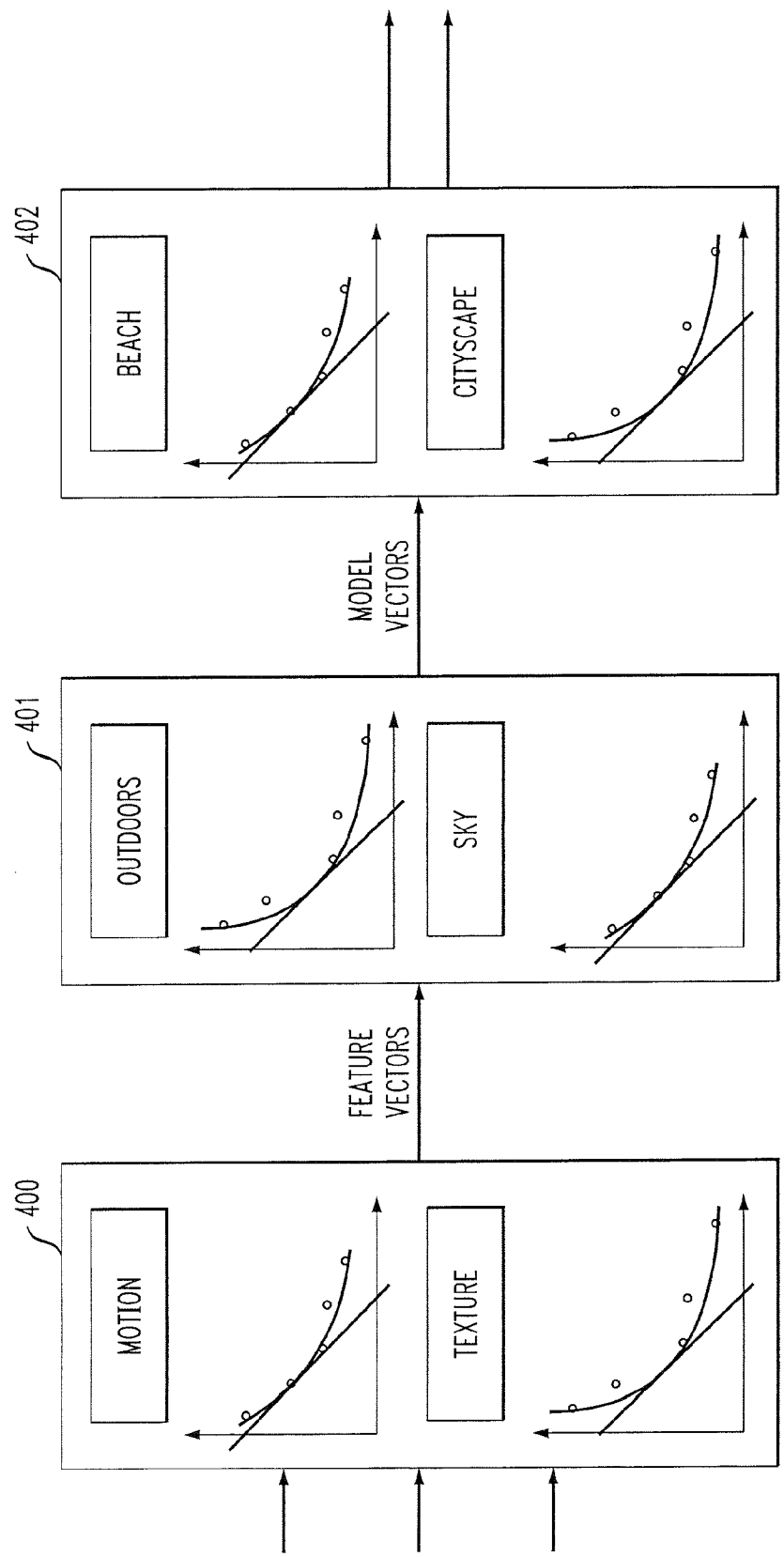
FIG. 4 is a diagram illustrating optimization of a large-scale classification system, according to an embodiment of the present invention.

Referring now to FIG. 4, a diagram illustrates optimization of a large scale classification system, according to an embodiment of the present invention. In the case of these cascaded classification system that consist of a number of stages, for example, feature extraction 400, atomic modeling 401 and composite modeling 402, there are multiple options for how to optimize the overall system performance.

A first option is to optimize over each stage independently using the methodology described in FIG. 2. This option is best suited when the constraints may be allocated among the stages. A second option is to optimize over a final stage and incorporate variability (processing paths) of prior stages as operating points at final stage. In this case, for example, each operating point of the "beach" detector would correspond to a combination of operating points for the feature detectors, such as, for example, color, and atomic models, such as, for example, outdoors. While this has potential to provide a better overall performance for cascaded systems, it involves a combinatorial explosion as all combinations of operating points of the stages are considered.

A third option is to jointly optimize over stages and operating points which combines the above two strategies, optimizing over stages independently when constraints may be allocated to stages, and combining operating points to characterize and select processing paths where constraints cannot be allocated to stages.

Figure 5:
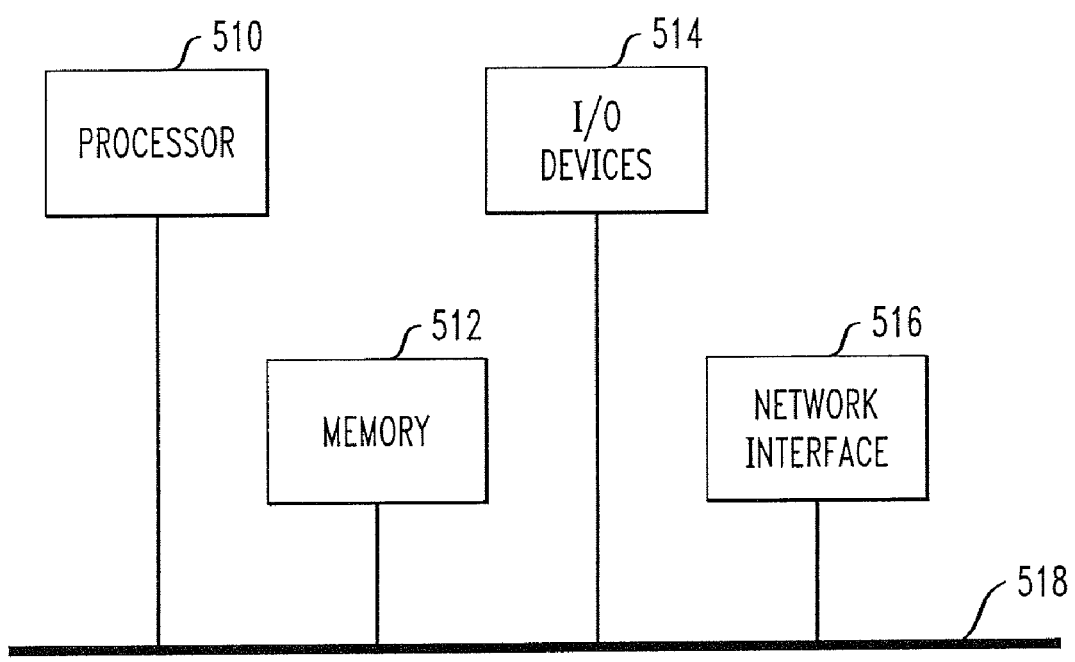
FIG. 5 is a diagram illustrating an illustrative hardware implementation of a computing system in accordance with which one or more components/methodologies of the present invention may be implemented, according to an embodiment of the present invention.

Referring now to FIG. 5, a block diagram illustrates an exemplary hardware implementation of a computing system in accordance with which one or more components/methodologies of the invention (e.g., components/methodologies described in the context of FIGS. 1-4) may be implemented, according to an embodiment of the present invention.

As shown, the computer system may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for optimizing resource allocation among data analysis functions in a classification system comprising the steps of:
    characterizing each of the data analysis functions as a set of operating points in multi-dimensional space corresponding to a plurality of dimensions of resource requirements and analysis quality;
    selecting an operating point for each of the data analysis functions in accordance with one or more constraints; and
    applying the analysis functions at selected operating points to optimize resource allocation among the data analysis functions in the classification system,
    wherein one or more of the steps of characterizing, selecting and applying are performed by a computer.

2. The method of claim 1, wherein the classification system comprises a large scale cascaded classification system.

3. The method of claim 1, wherein, in the step of selecting an operating point, the one or more constraints comprise at least one of a classification system constraint and a user constraint.

4. The method of claim 1, wherein, in the step of characterizing each of the data analysis functions, each operating point corresponds to a classification algorithm.

5. The method of claim 1, wherein the classification system comprises a plurality of classification stages, and each of the classification stages comprises one or more data analysis functions.

6. The method of claim 5, wherein the plurality of classification stages comprise at least one of feature extraction, atomic modeling and composite modeling.

7. The method of claim 1, wherein, in the step of characterizing each of the data analysis functions, the set of operating points are represented in a multidimensional space corresponding to one or more dimensions of resource requirements and analysis quality.

8. The method of claim 1, wherein, in the step of characterizing each of the data analysis functions, the resource requirements comprise at least one of computational, storage, communications and human requirements.

9. The method of claim 1, wherein, in the step of characterizing each of the data analysis functions, the analysis quality comprises at least one of average precision, classification rate, model validity assessments, receiver operating characteristic curves, reject curves, and precision curves.

10. The method of claim 1, wherein, in the step of characterizing each of the data analysis functions, each data analysis function is characterized offline as meta data.

11. The method of claim 1, wherein optimization occurs at each classification stage of the classification system.

12. The method of claim 1, wherein optimization occurs at a final stage of the classification system and incorporate variability of prior classification stages.

13. The method of claim 1, wherein optimization occurs at an individual classification stage of the classification system when constraints are capable of being allocated to the individual classification stage and optimization occurs at a final stage of the classification system when constraints are not capable of being allocated to prior classification stages.

14. The method of claim 1, wherein, in the step of characterizing each of the data analysis functions, the set operating points result from an application of at least one of feature extraction, clustering, classification and visualization methods.

15. The method of claim 1, wherein the step of selecting an operating point comprises the step of defining a constrained optimization problem.

16. The method of claim 15, wherein the constrained optimization problem maximizes analysis quality with respect to at least one of available resources and response time.

17. The method of claim 15, wherein the constrained optimization problem minimizes resource requirements with respect to a target analysis quality.

18. The method of claim 15, wherein the constrained optimization problem is converted into an unconstrained optimization problem in which operating points are selected given the one or more constraints using a Lagrangian method.

19. Apparatus for optimizing resource allocation among data analysis functions in a classification system, comprising:
    a memory; and
    at least one processor coupled to the memory and operative to: (i) characterize each of the data analysis functions as a set of operating points in multi-dimensional space corresponding to a plurality of dimensions of resource requirements and analysis quality; (ii) select an operating point for each of the data analysis functions in accordance with one or more constraints; and (iii) apply the analysis functions at selected operating points to optimize resource allocation among the data analysis functions in the classification system.

20. An article of manufacture for optimizing resource allocation among data analysis functions in a classification system, comprising a machine readable medium containing one or more programs which when executed implement the steps of:
    characterizing each of the data analysis functions as a set of operating points in multi-dimensional space corresponding to a plurality of dimensions of resource requirements and analysis quality;
    selecting an operating point for each of the data analysis functions in accordance with one or more constraints; and
    applying the analysis functions at selected operating points to optimize resource allocation among the data analysis functions in the classification system.

* * * * *